(12) United States Patent
Jougit

(10) Patent No.: US 7,809,333 B2
(45) Date of Patent: Oct. 5, 2010

(54) SYSTEM AND METHOD FOR STREAMING IDENTICAL DATA OVER SEVERAL SHORT RANGE LINKS

(75) Inventor: Michael Jougit, Mougins le Haut (FR)

(73) Assignee: Broadcom Corporation, Irvine, CA (US)

( * ) Notice: Subject to any disclaimer, the term of this patent is extended or adjusted under 35 U.S.C. 154(b) by 793 days.

(21) Appl. No.: 11/634,933

(22) Filed: Dec. 7, 2006

(65) Prior Publication Data

US 2008/0081560 A1 Apr. 3, 2008

Related U.S. Application Data

(60) Provisional application No. 60/848,050, filed on Sep. 29, 2006.

(51) Int. Cl.
*H04B 7/00* (2006.01)
(52) U.S. Cl. ..................................... 455/41.2
(58) Field of Classification Search ............... 455/41.2, 455/552.1; 375/130; 370/395.41
See application file for complete search history.

(56) References Cited

U.S. PATENT DOCUMENTS

| 7,298,748 | B2 * | 11/2007 | Yamato ................. 370/395.41 |
| 2002/0065045 | A1 * | 5/2002 | Kim ........................... 455/41 |
| 2004/0148426 | A1 * | 7/2004 | Hur et al. .................... 709/236 |
| 2007/0049196 | A1 * | 3/2007 | Hillyard et al. ............. 455/41.2 |
| 2007/0135046 | A1 * | 6/2007 | Kapur et al. ................ 455/41.2 |
| 2008/0051131 | A1 * | 2/2008 | Ibrahim et al. ........... 455/552.1 |

OTHER PUBLICATIONS

"An Overview of the Bluetooth Wireless Technology" IEEE Communications Magazine, Dec. 2001 Chatschik Bisdikian, IBM Corporation.*
"Streaming Audio Over Bluetooth ACL Links" Proceedings of the Inernational Conference on Information Technology: Comuputers and Communications (ITCC'03) 0-7695-1916-4/03 Amrit, Prit, Paul, Singh, Bilan Department of Computation, University of Manchester Institute of Science and Technology, UK.*
"Specification of the Bluetooth System, Host Controller Interface [Transport Layer]" vol. 04, Revision 1.2 or later, Issued Jan. 1, 2006 Bluetooth.RTM.*

* cited by examiner

*Primary Examiner*—Matthew D Anderson
*Assistant Examiner*—David Bilodeau
(74) *Attorney, Agent, or Firm*—Sterne, Kessler, Goldstein & Fox P.L.L.C.

(57) ABSTRACT

Method for streaming data over a plurality of data links formed between a Bluetooth® master device and a plurality of Bluetooth® slave devices includes constructing a vendor specific command host controller interface (HCI) packet, sending the vendor specific command HCI packet to a host controller of the Bluetooth® master device, and constructing at least one baseband packet addressed to each slave device of the plurality of slave devices. The vendor specific command HCI packet includes a plurality of ACL headers, a plurality of L2CAP headers, and a payload. A Bluetooth®-enabled device configured to stream data over a plurality of data links formed between a plurality of slave devices includes a Bluetooth®-enabled host adapted to construct a vendor specific command host controller interface (HCI) packet, an HCI transport layer and a host controller adapted to receive the vendor specific command HCI packet over the HCI transport layer.

20 Claims, 8 Drawing Sheets

SYSTEM AND METHOD FOR STREAMING IDENTICAL DATA OVER SEVERAL SHORT RANGE LINKS

CROSS-REFERENCE TO RELATED APPLICATIONS

This application claims benefit to U.S. Provisional Application No. 60/848,050, filed Sep. 29, 2006, which is incorporated by reference in its entirety herein.

BACKGROUND OF THE INVENTION

1. Field of the Invention

Certain embodiments of the invention relate to Bluetooth® devices. More specifically, certain embodiments of the invention relate to a system and method for sending identical data over several Bluetooth® links.

2. Background Art

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day. Bluetooth® devices, such as mobile phones and PDAs, are evolving to become more complex as such devices are adapted to transmit and receive audio and video data.

A user may configure a Bluetooth® device (i.e., a master device) to stream identical data to other Bluetooth® devices (i.e., slave devices) forming a piconet. Upon detection of the other devices of the piconet, the master device forms one Bluetooth® link (e.g., an ACL link or an L2CAP link) with each of the slave devices. The ACL or L2CAP link defines the communication protocol that enables communication of ACL data packets, for example, between the master device and each of the slave devices. Typically, each Bluetooth® device includes a Bluetooth®-enabled host and a host controller. The host and host controller communicate via the host controller interface (HCI). The HCI is a protocol layer of the several protocol layers that underpin Bluetooth® wireless technology.

When identical data is sent to a plurality of slave devices over a plurality of Bluetooth® links, the data sent over each link must first be sent over the HCI. The host controller interface restricts data throughput rates when the master device is configured to stream to several Bluetooth® slave devices. That is, when the master device streams identical data to n slave devices, the data is sent n times over the host controller interface. Sending multiple copies of identical data over the HCI may cause several undesirable effects. For example, delays caused by the HCI bottleneck may cause the interruptions in reception of streaming data by one or more of the slave devices. Furthermore, the master device may experience heavy CPU loads and excess power consumption. Increasing data throughput rates on the HCI when multi-streaming data to several slave devices will result in better synchronization between master and slave devices, and reduce power consumption and CPU load requirements.

BRIEF SUMMARY OF THE INVENTION

A system and method is provided for multi-streaming data between a Bluetooth®-enabled master device and a plurality of Bluetooth®-enabled slave devices.

In one embodiment, a method for streaming data over a plurality of data links formed between a Bluetooth® master device and a plurality of Bluetooth® slave devices comprises constructing a vendor specific command host controller interface (HCI) packet, sending the vendor specific command HCI packet to a host controller of the Bluetooth® master device, and constructing at least one baseband packet addressed to each slave device of the plurality of slave devices. The at least one baseband packet addressed to each slave device of the plurality of slave devices is constructed from one or more fields of the vendor specific command HCI packet. Additionally, the vendor specific command HCI packet includes a plurality of asynchronous connection-less (ACL) headers, a plurality of logical link control and adaptation layer protocol (L2CAP) headers, and a payload.

In another embodiment, a Bluetooth®-enabled device is configured to stream data over a plurality of data links formed between a plurality of slave devices. The Bluetooth®-enabled device comprises a Bluetooth®-enabled host adapted to construct a vendor specific command host controller interface (HCI) packet, an HCI transport layer and a host controller adapted to receive the vendor specific command HCI packet over the HCI transport layer. The vendor specific command HCI packet includes a payload and a plurality of headers having address information for the plurality of slave devices. The host controller is further adapted to construct at least one baseband packet addressed to each slave device of the plurality of slave devices, where each baseband packet includes the payload.

These and other advantages, aspects and novel features of the present invention, as well as details of an illustrated embodiment thereof, will be more fully understood from the following description and drawings.

DETAILED DESCRIPTION OF THE INVENTION

Figure 1:
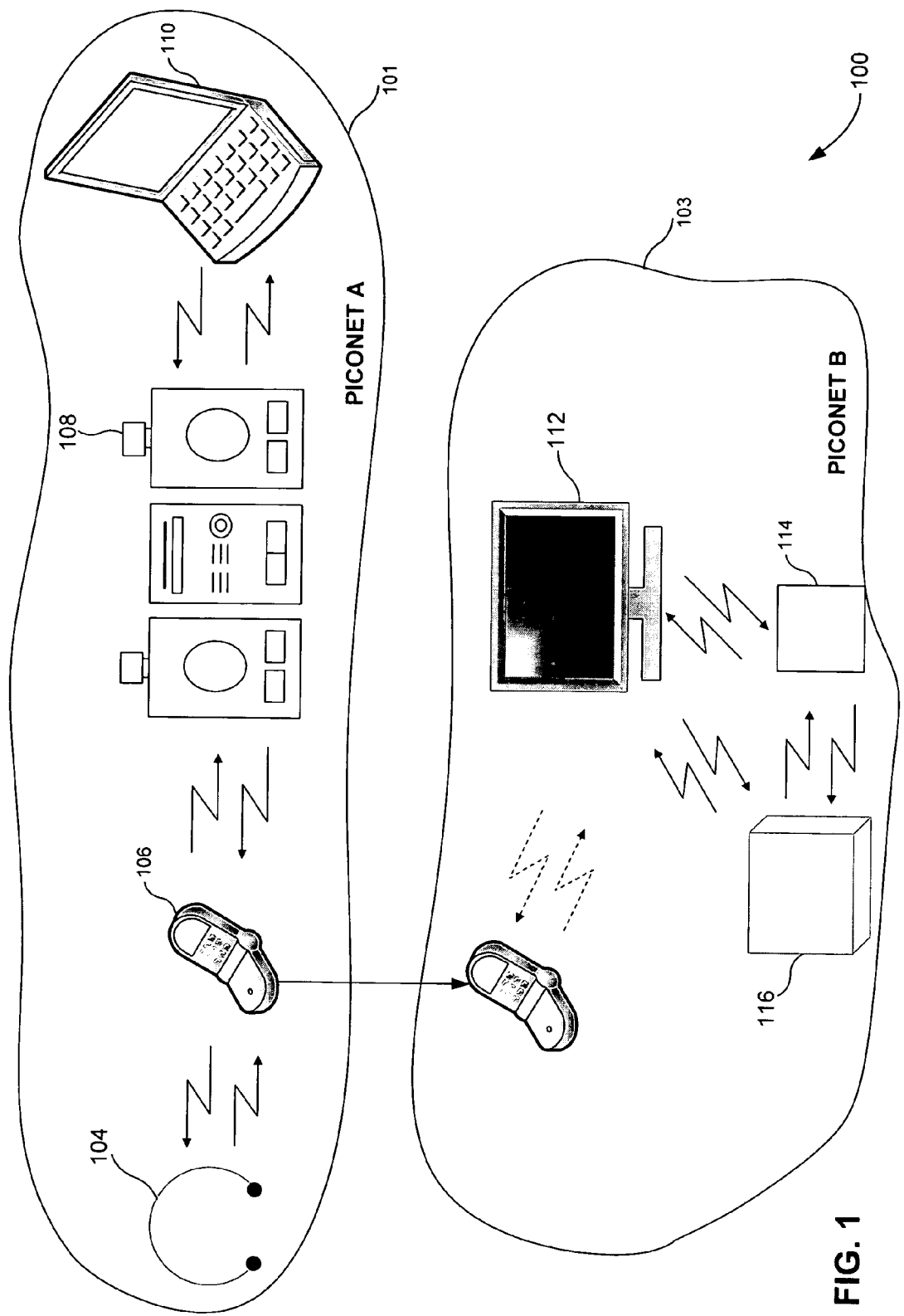
FIG. 1 illustrates a conventional scatternet of Bluetooth®-enabled devices for implementing embodiments of the present invention.

FIG. 1 illustrates a conventional scatternet 100 of Bluetooth®-enabled devices (also referred to as Bluetooth® devices) for implementing embodiments of the present invention. Bluetooth® devices develop communication links with each other to form networks known as piconets. Currently, seven active Bluetooth® devices may form a piconet. Typically, the maximum data throughput rate (i.e., data transmission capacity) between devices is between 2.0 and 3.0 megabits per second (Mbps), with data capacity shared between devices on a single piconet. As illustrated, the scatternet 100 includes a piconet A 101 and a piconet B 103.

Piconet A 101 includes a stereo headset 104, a mobile phone 106, a Bluetooth®-enabled stereo system 108, and a laptop computer 110, collectively referred to as piconet A Bluetooth® devices. The piconet A Bluetooth® devices may form communication links with one another. For example, the stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the laptop computer 110. Additionally, the PC 110 may receive video data (e.g., mpeg files) from the mobile phone 106.

Piconet B 103 includes a personal computer (PC) 112, a Bluetooth®-enabled PDA 114 and a printer 116. The PC 112, PDA 114 and printer 116 form communication links and may exchange data with each other. As Bluetooth® devices move, new piconets may form and established piconets may add or delete Bluetooth® devices. For example, when mobile phone 106 moves to a new location (represented by the dotted line), piconet B 103 adds mobile phone 106 to its network of communicatively-coupled devices and piconet A 101 deletes mobile phone 106 from its network of communicatively-coupled devices.

In operation, the Bluetooth® protocol utilizes a frequency hopping spread spectrum (FHSS) radio system operating in the 2.4 GHz unlicensed band. Its low power transmissions allow a typical range of about 1, 10 or 100 meters. As will be discussed further below in conjunction with FIG. 2, the Bluetooth® protocol also utilizes a protocol stack to transfer data and implement various advanced features that may be required by various applications. The Bluetooth® protocol stack may comprise a plurality of different protocols designed for different purposes. Various profiles, or applications, may reside above the protocol stack, and utilize the services that are offered by the Bluetooth® protocol stack. The Bluetooth® protocol may also comprise a lower protocol stack for link management and baseband control.

As discussed further below in conjunction with FIG. 4, one or more of the protocols within the Bluetooth® protocol stack may reside within a host device, such as a Bluetooth® enabled device. Other protocols within the Bluetooth® protocol stack, such as protocols within the lower Bluetooth® protocol stack, may reside within the Bluetooth® chip (i.e., the host controller). For example, encoding of audio or video data may reside in the upper Bluetooth® protocol stack, while frequency hopping may reside in the lower Bluetooth® protocol stack residing on the Bluetooth® chip.

Figure 2:
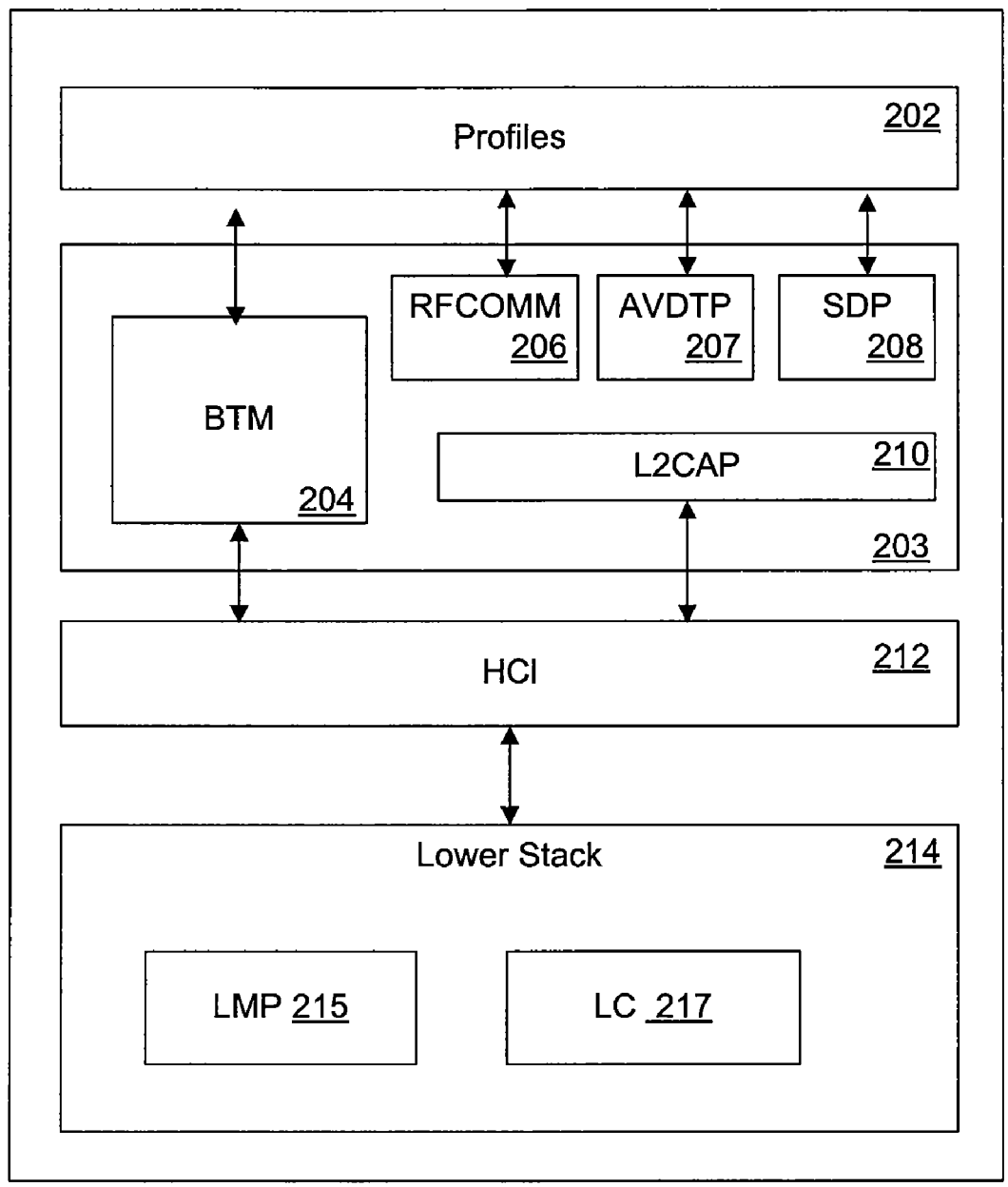
FIG. 2 is a simplified exemplary Bluetooth® protocol stack, according to an embodiment of the invention.

FIG. 2 is a simplified exemplary Bluetooth® protocol stack 201. The exemplary Bluetooth® protocol stack 201 comprises a profiles layer 202, an upper protocol stack 203, a host controller interface (HCI) 212, and a lower protocol stack 214. The profiles layer 202 may comprise profiles of one or more applications that may be utilized in connection with the Bluetooth® protocol stack 201.

The upper protocol stack 203 includes a Bluetooth® management entity (BTM) layer 204, radio frequency communication (RFCOMM) protocol 206, audio/video distribution transport protocol (AVDTP) 207, service discovery protocol (SDP) 208 and logical link control and adaptation protocol (L2CAP) 210. The BTM layer 204 makes it possible for various equipment to have wireless communication by integrating with a Bluetooth® module. The RFCOMM protocol 206 may be utilized to provide emulation of RS-232 serial ports over the L2CAP protocol, providing both transport capabilities for upper level services, such as OBEX, that use serial line as the transport mechanism.

The SDP 208 may be utilized for querying Bluetooth® device information, Bluetooth® device services, and characteristics of the services. The L2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. As discussed further below in conjunction with FIG. 4, the HCI 212 may be adapted to provide a command interface to a baseband controller and link manager, and access hardware status and control registers.

The Audio/Video Distribution Transport Protocol (AVDTP) 207 is the protocol designed especially for Bluetooth® streaming audio and video. It may perform the signaling that may be utilized to configure, open, and/or close a stream between two Bluetooth® devices. An Audio stream data may be transferred utilizing real-time protocol (RTP) packets. AVDTP resides in the protocol stack above L2CAP and may utilize separate L2CAP channels for signaling and data.

The lower stack 214 may comprise a link manager protocol (LMP) 215 and a link controller (LC) 217. The link manager (LM) 215 may be adapted to carry out link setup, authentication, link configuration and other protocols. The link manager 215 may also discover other remote LM's and communicates with them via the LMP. To perform its service provider role, the LM 215 may utilize the underlying Link Controller (LC) 217. The LMP essentially comprises a number of protocol data units (PDUs), which may be sent from one device to another, determined by an address in the packet header, for example. The LMP 215 may control the communication between various Bluetooth® enabled devices, such as a phone and a PC.

The LC 217 within the lower stack 214 may be adapted to handle Bluetooth® baseband functions, such as encoding of voice and/or data packets, error correction, slot delimitation, frequency hopping, radio interface, data encryption, and/or link authentication. In addition, the LC 217 may be adapted to execute link management software associated with the LMP 215. The link manager's control may include setting up the communication link and performing authentication, configuration, and other protocols, for example.

Figure 3:
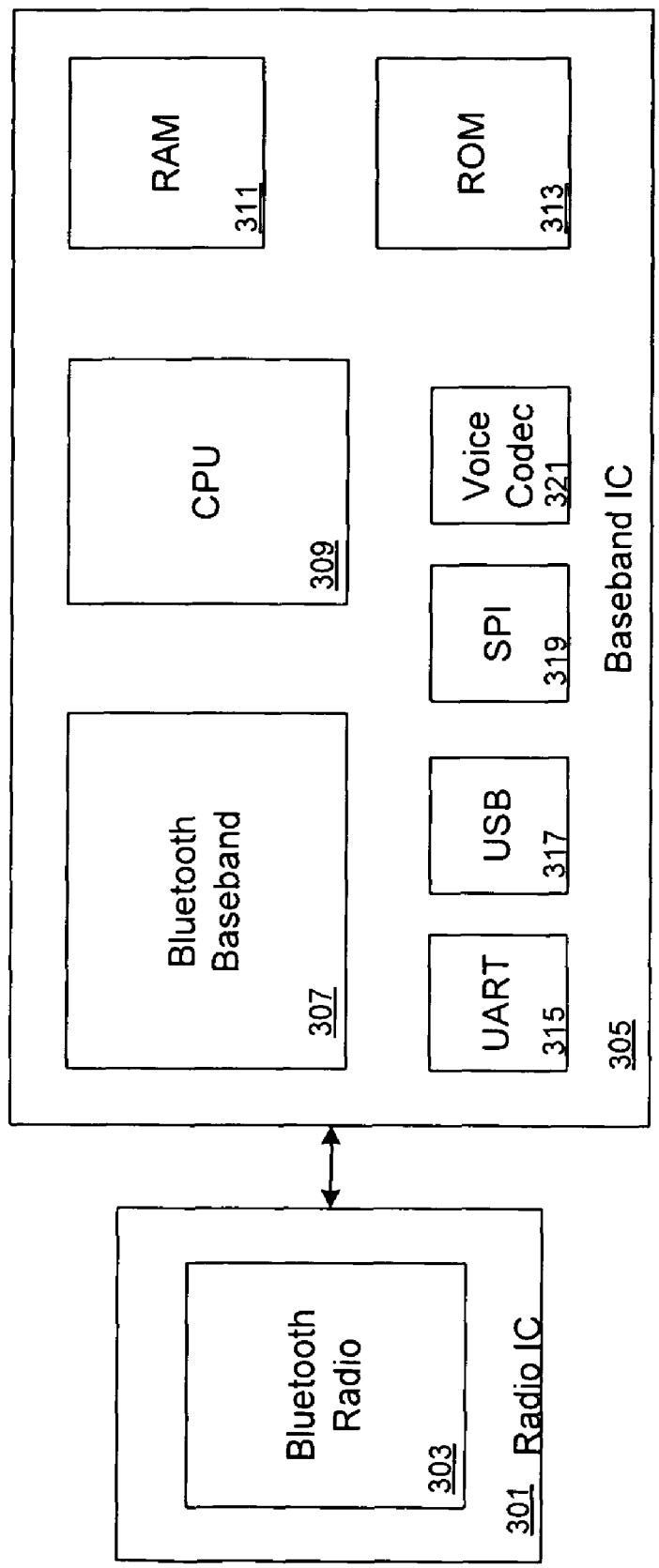
FIG. 3 is a block diagram illustrating an exemplary Bluetooth® hardware implementation, according to an embodiment of the invention.

Bluetooth® hardware implementations are typically highly integrated systems consisting of one or two chips. FIG. 3 is a block diagram illustrating an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, processor 309, random access memory (RAM) 311, read only memory (ROM) 313, voice CODEC 321, a serial peripheral interface (SPI) 319, universal serial bus (USB) 317, and universal asynchronous receiver/transmitter (UART) 315. The radio IC 301 may be implemented in a separate chip. The processor 309 may be adapted to operate all the required software including lower stack, upper stack, and embedded profile, for example. This type of single CPU implementation allows for a small, low power, and low cost solution.

Figure 4:
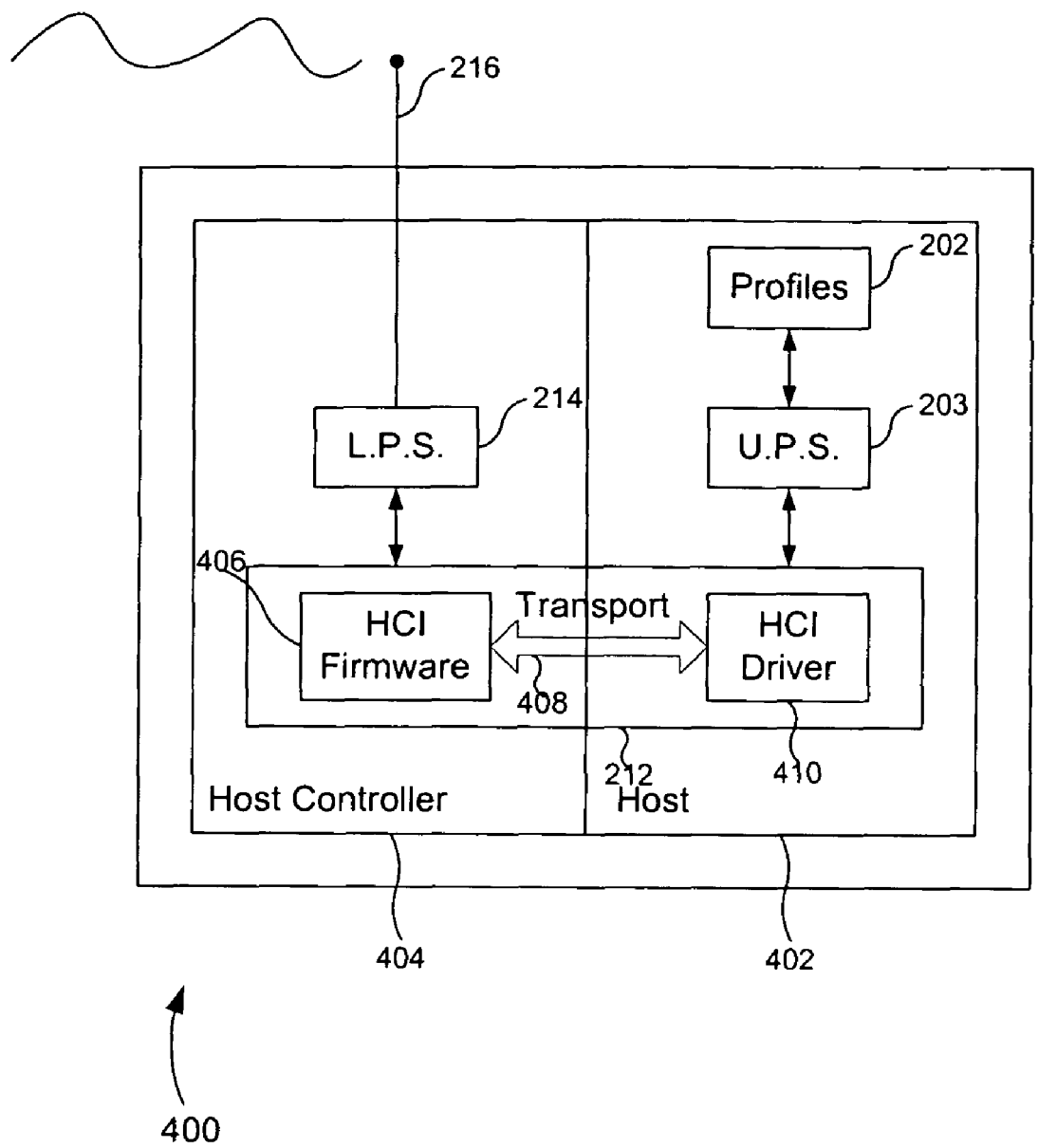
FIG. 4 is an schematic diagram of a Bluetooth® device 400, according to an embodiment of the invention.

FIG. 4 is an schematic diagram of a Bluetooth® device 400, according to an embodiment of the invention. The Bluetooth® device includes a Bluetooth®-enabled host 402 (also referred to as a host) and a host controller 404. In one embodiment, functionality of the host 402 is provided by software and functionality of the host controller 404 is provided by firmware, including one or more integrated circuits, such as the Bluetooth® baseband IC 305 (FIG. 3) and the radio IC 301 (FIG. 3). The host 402 includes the upper protocol stack 203 and the profiles layer 202. The host controller 404 includes the lower protocol stack 214 communicatively coupled to an antenna 216. In addition, the host controller interface (HCI) 212 resides partly within the host 402 and partly within the host controller 404. The HCI 212 enables communication between the host 402 and the host controller 404. For example, the HCI 212 provides a method of accessing Bluetooth® baseband capabilities within the lower protocol stack 214.

As illustrated, the HCI 212 includes HCI firmware 406, an HCI transport layer 408 and an HCI driver 410. The HCI firmware 406 resides on the host controller 404 and the HCI driver 410 resides on the host 402. The HCI transport layer 408 may include several layers that allow the HCI driver 410 and HCI firmware 406 to communicate. For example, the HCI transport layer 408 may support USB, UART and RS232 communication protocol. All data (e.g., audio, video, commands, events, or other types of information) conveyed between the host 402 and the host controller 404 are conveyed over the three HCI layers in the form of packets. For example, data may be carried by HCI UART, HCI USB or HCI RS232 packets (collectively referred to as HCI packets).

In operation, the HCI driver 410 may, in conjunction with the profiles layer 202 and the upper protocol stack 203, drive the HCI firmware 406 over the HCI physical transport layer 408. The HCI driver 410 may send HCI UART, HCI USB or HCI RS232 packets including host to controller commands. Additionally, the HCI driver 410 may send HCI packets comprising ACL data packets or SCO data packets. Furthermore, the host controller 404 may send the host 402 HCI packets comprising controller-to-host-event payload packets. HCI packet communication between the host 402 and the host controller 404 will be discussed further below in conjunction with FIGS. 5-10.

Figure 5A:
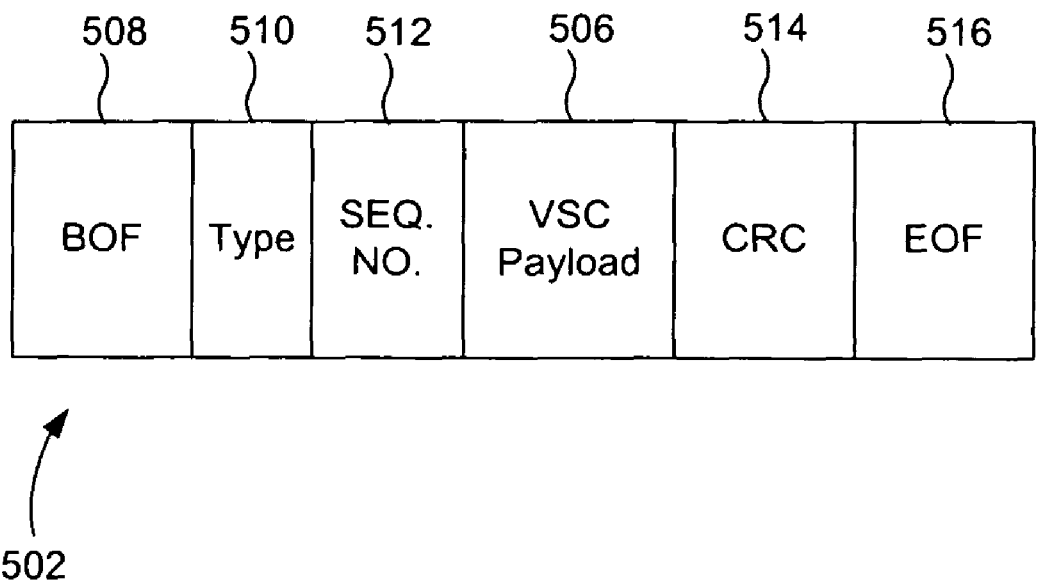
FIG. 5A illustrates a vendor specific command (VSC) HCI RS-232 packet, according to an embodiment of the invention.
Figure 5B:
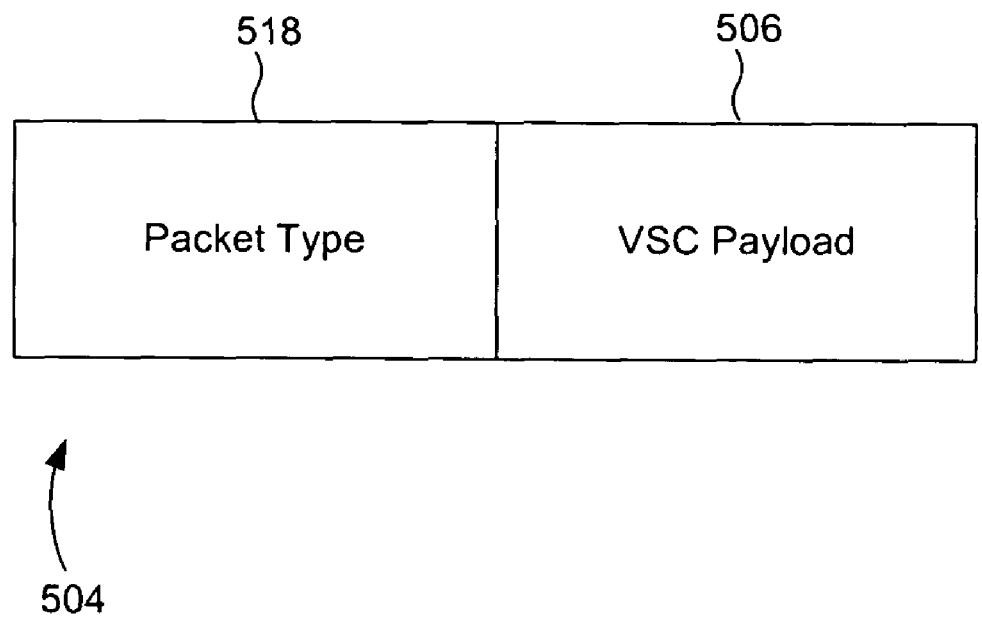
FIG. 5B illustrates a VSC HCI UART/USB packet, according to an embodiment of the invention.

FIG. 5A illustrates a vendor specific command (VSC) HCI RS-232 packet 502 and FIG. 5B illustrates a VSC HCI UART/USB packet 504, according to embodiments of the present invention. Both the VSC HCI RS-232 packet and the VSC HCI UART/USB packet include a vendor specific command (VSC) payload 506. As in known to one of skill in the art, a conventional HCI RS-232 packet typically includes other fields. These other fields may also be contained within the VSC HCI RS-232 packet, including a beginning of file (BOF) 508, a type 510, a sequence number 512, a cyclic redundancy check (CRC) 514 and an end of file (EOF) 516. The VSC HCI UART/USB packet is identified by the packet type 518 either as a VSC HCI UART packet or a VSC HCI USB packet. One of skill in the art will appreciate that the VSC HCI RS-232 packet and the VSC HCI UART/USB packet may include additional fields or other combinations of fields, dependent upon variations in the Bluetooth® protocol stack.

Figure 6:
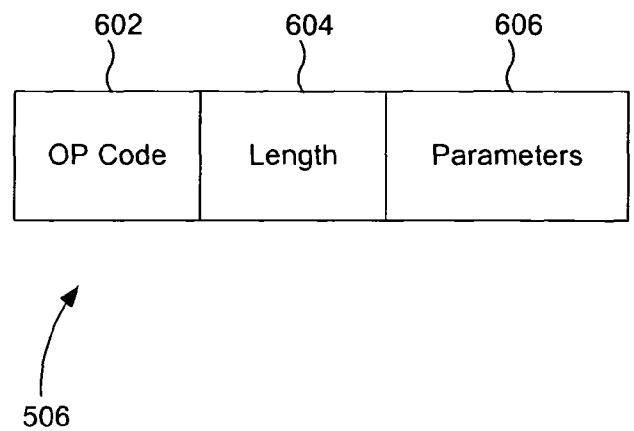
FIG. 6 illustrates the VSC payload as shown in FIGS. 5A-5B, according to an embodiment of the invention.

FIG. 6 illustrates the VSC payload 506 as shown in FIGS. 5A-5B, according to an embodiment of the present invention. As illustrated, the VSC payload 506 includes an opcode 602, a length 604, and a parameters field 606. The opcode 602 is typically 16 bits (i.e., 2 bytes) that identify the command being sent. According to an embodiment of the invention, the opcode 602 identifies the command which the host controller 404 (FIG. 4) uses to operate on the parameters field 606. The host controller 404, upon identifying the opcode 602 as a vendor specific command, processes the parameters field 606 accordingly, as described in more detail below. The length 604 is equal to the total length (in bytes or bits, for example) of the parameters field 606.

Figure 7:
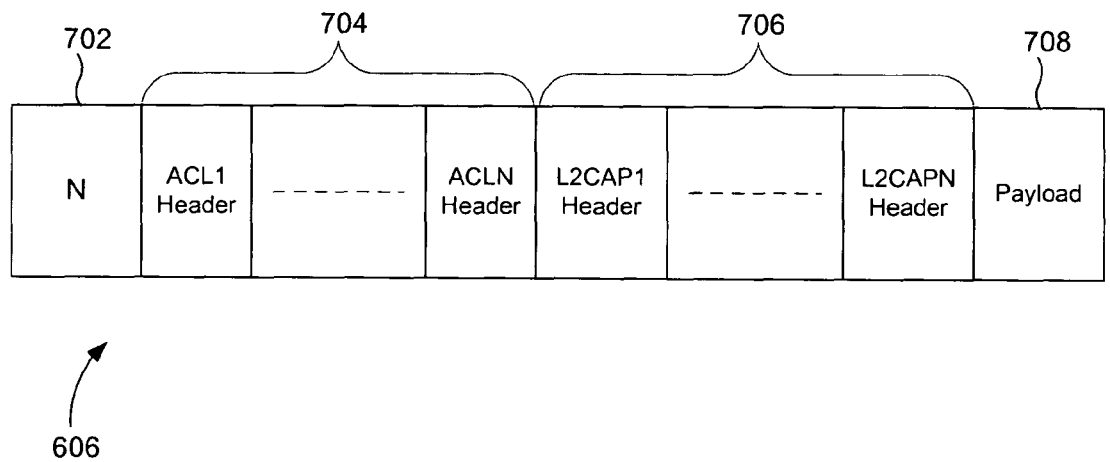
FIG. 7 illustrates the parameters field as shown in FIG. 6, according to an embodiment of the invention.

FIG. 7 illustrates the parameters field 606 as shown in FIG. 6, according to an embodiment of the present invention. The parameters field 606 includes a number "n" of slave devices 702 (where "n" is an integer greater than 1) which receive the streaming data, ACL headers 704 (i.e. "n" ACL headers labeled ACL1, ACL2 . . . , ACLn), L2CAP headers 706 (i.e. "n" L2CAP headers labeled L2CAP1, L2CAP2, . . . , L2CAPn) and payload 708. For example, if the Bluetooth®-enabled master device is sending identical data to six Bluetooth®-enabled slave devices (e.g., sending streaming audio to six slave devices), then n=6. Each ACL header of the n ACL headers includes identification information (i.e., an address) of a slave device. Each L2CAP header of the n L2CAP headers includes a channel identifier for identifying an end-point of an L2CAP channel of a slave device. Channel identifiers and the L2CAP layer is discussed in more detail in the Web document entitled "L2CAP Specification" located at http://www.pday.com.cn/technology/bluetooth_documents/L2CAP.PDF#search='L2CAP%20data%20packets', herein incorporated by reference. In one embodiment of the invention, each ACL header is associated with a L2CAP header. For example, ACL1 header identifies a first Bluetooth® slave device to receive the steaming data, and the corresponding L2CAP1 header identifies an end-point of an L2CAP channel of the first Bluetooth® slave device.

The payload 708 may comprise L2CAP data or ACL data. Typically, the lower protocol stack is configured to wirelessly transmit and receive streaming data via broadband packets of a maximum packet length defined by the Bluetooth® protocol stack. The L2CAP and profiles of the upper protocol stack are adapted to process packets of a larger size. In one embodiment, the L2CAP in cooperation with one or more application profiles packages a plurality of ACL data into one L2CAP data.

Figure 8:
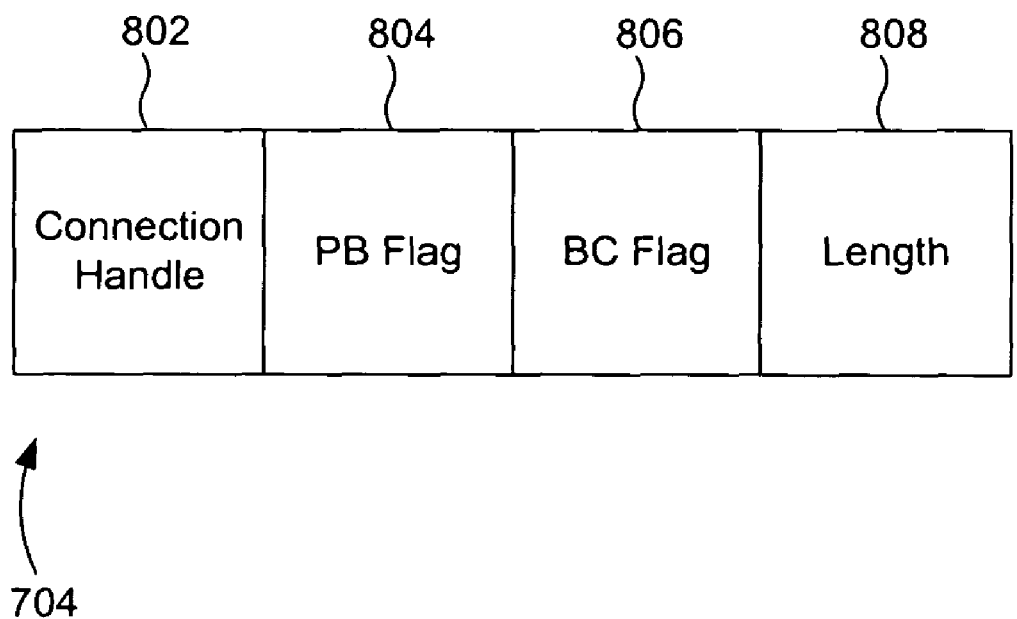
FIG. 8 illustrates the ACL1 header of FIG. 7, according to an embodiment of the present invention.

FIG. 8 illustrates the ACL1 header 704 of FIG. 7, according to an embodiment of the present invention. The ACL1 header 704 includes the following fields: a connection handle 802, a packet boundary (PB) flag 804, a broadcast (BC) flag flag 806, and a length 808. The connection handle 802 identifies a Bluetooth® slave device to receive the payload 808. As will be discussed in more detail below in conjunction with FIG. 10, the host controller constructs a baseband packet for wireless transmittal. Each baseband packet includes an ACL header, a corresponding L2CAP header and the payload 708. The other fields of ACL1 header 704 are well known to one of skill in art.

Figure 9:
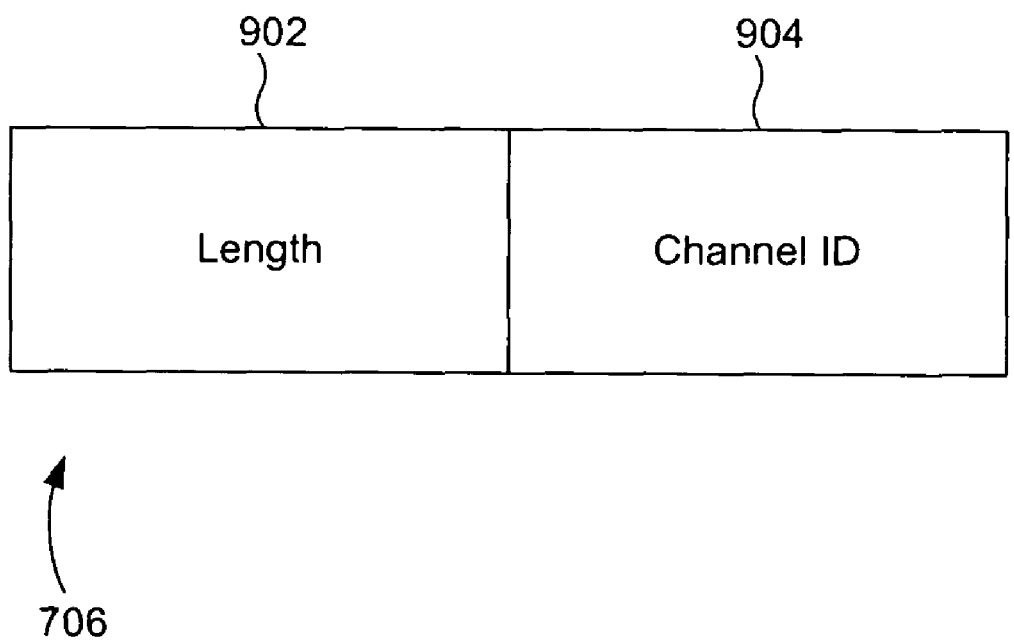
FIG. 9 illustrates the L2CAP1 header of FIG. 7, according to an embodiment of the present invention.

FIG. 9 illustrates the L2CAP1 header 706 of FIG. 7, according to an embodiment of the present invention. The L2CAP1 header 706 includes a length 902 and a channel identifier 904. The channel identifier 904 identifies an endpoint of an L2CAP channel of the Bluetooth® slave device identified by the connection handle 802 (FIG. 8) of the associated ACL1 header 704.

Figure 10:
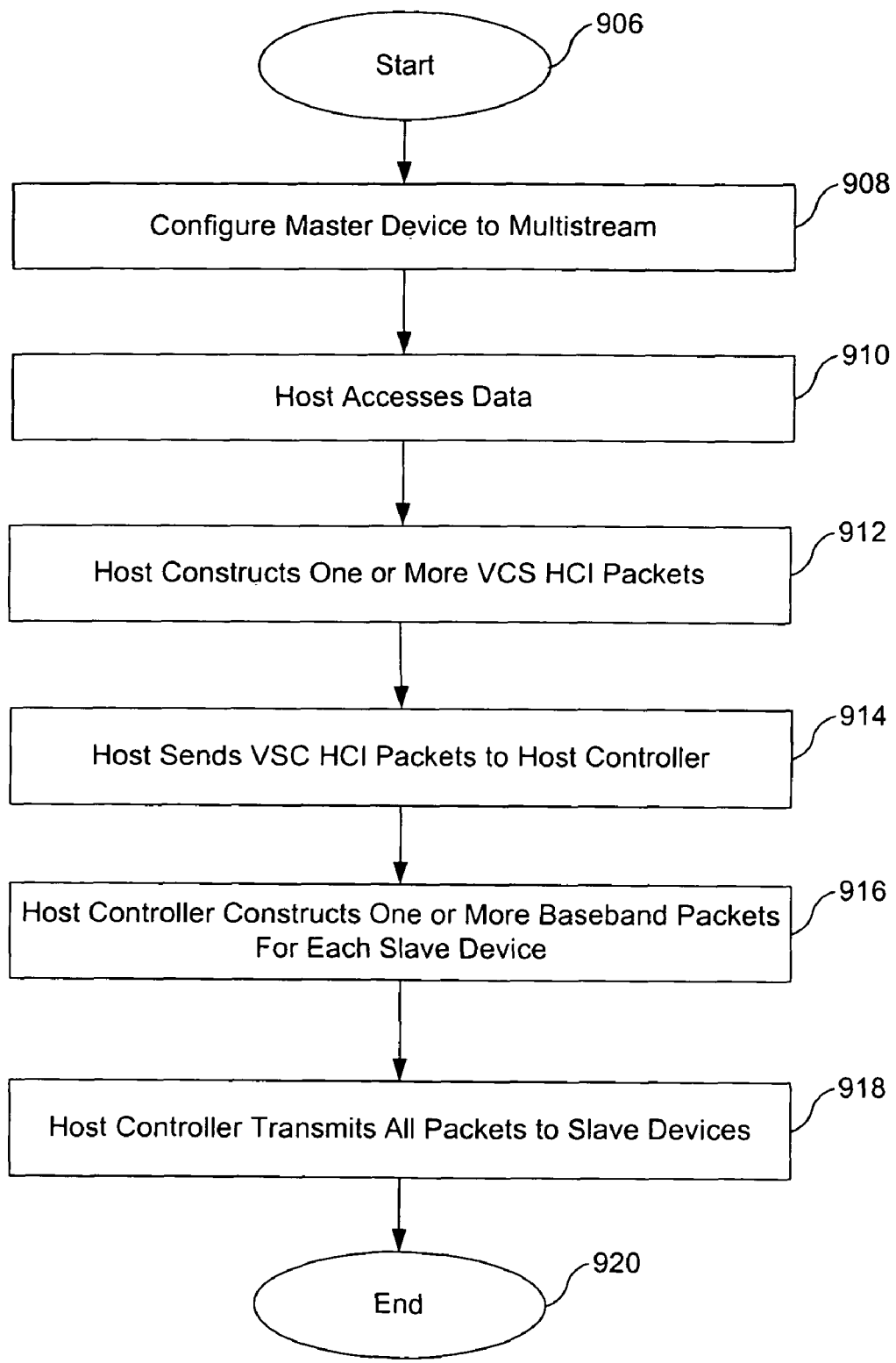
FIG. 10 is a flow diagram illustrating exemplary steps for streaming data between a Bluetooth® master device and a plurality of Bluetooth® slave devices, in accordance with an embodiment of the invention.

FIG. 10 is a flow diagram for streaming data between a Bluetooth® master device and a plurality of Bluetooth® slave devices. Typically, the master and slave devices form a piconet communication network of Bluetooth® devices.

At step 908, a user instructs a master Bluetooth® device to stream data to Bluetooth® devices that comprise a piconet with the master device. However, the user may instruct the Bluetooth® master device to stream data to a selected subset of Bluetooth® devices that comprise the piconet. For example, in one embodiment the user may instruct the Bluetooth® master device to stream data to any number of Bluetooth® slave devices on the piconet via an input keypad. For illustration purposes only, assume in the following exemplary embodiment that the Bluetooth® master device is instructed to multistream with 6 slave devices on the piconet. As in well known to one of skill in the art, the CPU 309 of the Bluetooth® master device executes an operating system and software implementations of the host 402 and host controller 404.

At step 910, the host 402 of the Bluetooth® master device accesses data that is stored on the master device. For example, the data may be stored on RAM 311 or any other memory of the Bluetooth® baseband integrated circuit 305. At step 912, the upper protocol stack 203 of the host 402 constructs a vendor specific command HCI packet that incorporates a accessed data as the payload 708 of the VSC payload field 506. Dependent upon the underlying protocol of the HCI transport layer 408, the upper protocol stack 203 constructs either a vendor specific command HCI RS-232 packet, an vendor specific command HCI UART packet, or a vendor specific command HCI USB packet. The VSC payload 506 includes the opcode 602, a parameters field 606, and a length 604 that informs the host controller 404 of the length of the parameters field 606. In this exemplary embodiment given that data is to be streamed to 6 slave devices, the parameters field 606 includes the integer n=6 (i.e., "n" 702) identifying the number of slave devices to which data is to be streamed. The parameters field also includes n ACL headers 704, n L2CAP headers 706, and a payload 708. The payload 708 may comprise either ACL data or L2CAP data. In one embodiment, the L2CAP data includes a plurality of ACL data. L2CAP data and ACL data is discussed further in the document entitled "Bluetooth Protocol Stack" located at http://homepage.ntlworld.com/octonl/htmllbt/TheBluetoothProtocolStack.html, herein incorporated by reference.

In one embodiment, each ACL header of the ACL headers 704 includes a connection handle 802 that identifies a particular slave device (i.e., a particular Bluetooth® receiving device) on the piconet, If the payload 708 of the VSC payload 506 is ACL data, each ACL header may include a packet boundary (BP) flag that identifies whether the ACL data is a first data segment or a continuing data segment of a L2CAP segment. The ACL header 704 may also include a length field 808 that identifies the length of the ACL data in bytes (or alternatively in bits). However, if the payload 708 of the VSC payload 506 is L2CAP data, then the ACL header 704 may not include the PB flag 804 and the length field 808.

Additionally, each L2CAP header of the L2CAP headers 706 corresponds with a ACL header of the ACL headers 704. Additionally, each L2CAP header includes a channel identifier (ID) 904. In one embodiment, the channel ID 904 is a name that represents a logical channel endpoint in the receiving slave device. As discussed above, the receiving slave device is identified by the ACL header corresponding to the L2CAP header. If the payload 708 of the VSC payload 506 is L2CAP data, then each L2CAP header of the L2CAP headers 706 includes a L2CAP length field 902 that identifies the length of the L2CAP data in bytes (or alternatively in bits).

At step 914, the host 402 sends the vendor specific command HCI packet to the host controller 404 via the HCI transport layer 408. At step 916, the host controller constructs one or more broadband packets for each Bluetooth® slave device. For example, if the VSC payload 506 includes n ACL headers 704 (e.g., ACL1 header, ACL2 header, . . . , ACLn header), n L2CAP headers 706 (e.g., L2CAP1 header, L2CAP2 header, . . . , L2CAPn header) and payload 708, then the host controller 404 constructs at least n baseband packets where each baseband packet is addressed to a different slave device of the n slave devices. For example, the host controller 404 constructs a first baseband packet addressed to a first slave device, where the packet includes the ACL1 header, the L2CAP1 header, and the payload 708. The host controller 404 also constructs a second baseband packet addressed to a second slave device, where the packet includes the ACL2 header, the L2CAP2 header, and the payload 708. The host controller 404 constructs at least n baseband packets.

If the payload comprises multiple ACL data (also referred to as multiple ACL data segments), then the host controller 404 sends multiple baseband packets to each designated slave device. For example, if the payload comprises 4 ACL data segments, then the host controller constructs four baseband packets addressed to a first slave device, where the first packet addressed to the first slave device includes the ACL1 header, the L2CAP1 header and the first ACL data segment, the second packet addressed to the first slave device includes the ACL1 header, the L2CAP1 header and the second ACL data segment, the third packet addressed to the first slave device includes the ACL1 header, the L2CAP1 header and the third ACL data segment and the fourth packet addressed to the first slave device includes the ACL1 header, the L2CAP1 header and the fourth ACL data segment. Similarly, the host controller 404 constructs 4 baseband packets addressed to each of the remaining n-1 slave devices.

In one embodiment, the HCI firmware protocol stack 406 and/or the lower protocol stack 214 of the host controller 404 constructs the baseband packets addressed to each of the n slave devices based upon information contained within the vendor specific command HCI packets received from the host 402 via the HCI transport layer 408.

At step 918, the host controller 404 transmits the baseband packets to the n slave devices via the antenna 216.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for streaming data over a plurality of data links formed between a master device and a plurality of slave devices, comprising:
    (a) constructing a vendor specific command host controller interface (HCI) packet, the vendor specific command HCI packet including:
        (i) a plurality of asynchronous connection-less (ACL) headers,
        (ii) a plurality of logical link control and adaptation layer protocol (L2CAP) headers, and
        (iii) a payload;
    (b) sending the vendor specific command HCI packet to a host controller of the master device; and
    (c) constructing at least one baseband packet addressed to each slave device of the plurality of slave devices from the vendor specific command HCI packet, the at least one baseband packet addressed to each slave device including the payload.

2. The method according to claim 1, further comprising:
    (d) wirelessly transmitting the at least one baseband packet addressed to each slave device of the plurality of slave devices.

3. The method according to claim 1, wherein each ACL header of the plurality of ACL headers includes an address of a slave device of the plurality of slave devices.

4. The method according to claim 1, wherein each L2CAP header of the plurality of L2CAP headers includes a channel identifier for identifying an end-point of an L2CAP channel of a slave device of the plurality of slave devices.

5. The method according to claim 1, wherein the payload comprises ACL data.

6. The method according to claim 1, wherein the payload comprises L2CAP data.

7. The method according to claim 1, wherein step (b) comprises:
    (b)(i) sending the vendor specific command HCI packet to the host controller over an HCI transport layer.

8. The method according to claim 1, further comprising:
    (d) accessing data stored in a memory of the master device, and wherein step (c) comprises:
    (c)(i) constructing the vendor specific command HCI packet using the accessed data.

9. A device configured to stream data over a plurality of data links formed between a plurality of slave devices, comprising:
    (a) a host adapted to construct a vendor specific command host controller interface (HCI) packet, the vendor specific command HCI packet including:
        (i) a payload;
        (ii) a plurality of headers of a first type having address information for the plurality of slave devices; and
        (iii) a plurality of headers of a second type different from said first type having address information for the plurality of slave devices; and
    (b) an HCI transport layer; and
    (c) a host controller configured to receive the vendor specific command HCI packet over the HCI transport layer and to construct at least one baseband packet addressed to each slave device, the at least one baseband packet addressed to each slave device including the payload.

10. The device of claim 9, wherein the host includes an upper protocol stack configured to construct the vendor specific command HCI packet.

11. The device of claim 9, wherein the host controller includes a central processing unit (CPU).

12. The device of claim 9, wherein the host controller includes a baseband integrated circuit.

13. The device of claim 12, wherein the baseband integrated circuit is configured to construct the at least one baseband packet addressed to each slave device of the plurality of slave devices.

14. A system for streaming data over a plurality of data links formed between a master device and a plurality of slave devices, comprising:
    means for constructing a vendor specific command host controller interface (HCI) packet, the vendor specific command HCI packet including:
        (i) a plurality of asynchronous connection-less (ACL) headers,
        (ii) a plurality of logical link control and adaptation layer protocol (L2CAP) headers, and
        (iii) a payload;
    means for sending the vendor specific command HCI packet to a host controller of the master device; and
    means for constructing at least one baseband packet addressed to each slave device of the plurality of slave devices from the vendor specific command HCI packet, the at least one baseband packet addressed to each slave device including the payload.

15. The system according to claim 14, further comprising:
    means for wirelessly transmitting the at least one baseband packet addressed to each slave device of the plurality of slave devices.

16. The system according to claim 14, wherein each ACL header of the plurality of ACL headers includes an address of a slave device of the plurality of slave devices.

17. The system according to claim 14, wherein the payload comprises L2CAP data.

18. The system according to claim 14, wherein means for sending further comprises:
    means for sending the vendor specific command HCI packet to the host controller over an HCI transport layer.

19. The system according to claim 14, further comprising:
    means for accessing data stored in a memory of the master device, wherein means for constructing the vendor specific command HCI packet further includes means for constructing the vendor specific command HCI packet using the accessed data.

20. A non-transitory electronic-readable medium having embodied thereon a program, the program being executable by a machine to perform method steps for streaming data over a plurality of data links formed between a master device and a plurality of slave devices, the method steps comprising:
    (a) constructing a vendor specific command host controller interface (HCI) packet, the vendor specific command HCI packet including:
    (b) a plurality of asynchronous connection-less (ACL) headers,
    (c) a plurality of logical link control and adaptation layer protocol (L2CAP) headers, and (d) a payload;

(e) sending the vendor specific command HCI packet to a host controller of the master device; and (f) constructing at least one baseband packet addressed to each slave device of the plurality of slave devices from the vendor specific command HCI packet, the at least one baseband packet addressed to each slave device including the payload.

* * * * *

UNITED STATES PATENT AND TRADEMARK OFFICE
CERTIFICATE OF CORRECTION

| | |
|---|---|
| PATENT NO. | : 7,809,333 B2 |
| APPLICATION NO. | : 11/634933 |
| DATED | : October 5, 2010 |
| INVENTOR(S) | : Michael Jougit |

It is certified that error appears in the above-identified patent and that said Letters Patent is hereby corrected as shown below:

At Title Page, Item (56), column 2, under "OTHER PUBLICATIONS", line 5, "Inernational" should read --International--, and "Comuputers" should read --Computers--.

At column 6, line 55, "flag flag" should read --flag--.

At column 7, line 46, "http://homepage.ntlworld.com/octon1/htmllbt/TheBlue-" should read --http://homepage.ntlworld.com/octon1/html/bt/TheBlue- --.

At column 9, line 62, "adapted" should read --configured--.

At column 10, line 3, "devices; and" should read --devices;--.

Signed and Sealed this
Sixteenth Day of August, 2011

David J. Kappos
*Director of the United States Patent and Trademark Office*